United States Patent [19]

Diehl et al.

[11] 4,068,205

[45] Jan. 10, 1978

[54] RESISTANCE ELEMENT FOR A RESISTANCE THERMOMETER

[75] Inventors: Walter Diehl, Hanau; Wolfgang Koehler, Alzenau-Horstein, both of Germany

[73] Assignee: Deutsche Gold- und Silber-Scheideanstalt vormals Roessler, Frankfurt, Germany

[21] Appl. No.: 749,108

[22] Filed: Dec. 9, 1976

[30] Foreign Application Priority Data

Dec. 24, 1975 Germany .............................. 7541295

[51] Int. Cl.$^2$ .............................................. H01C 3/04
[52] U.S. Cl. ...................................... 338/25; 338/226; 338/273; 338/274
[58] Field of Search .................. 338/25, 28, 226, 229, 338/233, 237, 273, 274, 276, 308; 73/362 AR, 359; 29/613, 620, 621

[56] References Cited

U.S. PATENT DOCUMENTS

| | | | |
|---|---|---|---|
| 2,946,974 | 7/1960 | Sias | 338/28 |
| 2,957,153 | 10/1960 | Greenberg | 73/362 AR |
| 3,845,443 | 10/1974 | Fisher | 338/25 |
| 3,939,557 | 2/1976 | Rendle | 29/613 X |

*Primary Examiner*—C. L. Albritton
*Attorney, Agent, or Firm*—Cushman, Darby & Cushman

[57] ABSTRACT

There is provided a resistance element comprising a cylindrical carrier body, a rectangular bore therein in the direction of the longitudinal axis, a ceramic plate within said bore and securely bound to a flat wall of said carrier body, a thin layer platinum-resistor path with a temperature dependent electrical resistance firmly adhering to the surface of the ceramic plate opposite to that bound to said carrier body, electrical lead wires connected to said resistor path, said lead wires being secured to at least one end of said carrier body by an electrically nonconducting sealing composition and said lead wires passing through said sealing composition to the outside.

2 Claims, 2 Drawing Figures

RESISTANCE ELEMENT FOR A RESISTANCE THERMOMETER

The invention is directed to a resistance element in which a ceramic plate carrying a thin resistance layer is secured in the bore of a cylindrical carrier body.

Practically all of the resistance element used in temperature measurement today are wire resistances in which there is generally used as the resistance material platinum or nickel, although in a few cases copper is also used.

For employment at higher temperatures, the platinum wire resistance element have gained preference. The manufacture of these resistance elements in the finished form is expensive. In order to produce indispensable fatigue strength of the resistor for industrial purposes, it is necessary to reinforce the wire coil on its entire length, i.e., to fasten or sinter it to the carrier body. The temperature of use of such wire resistors is limited on the upper side by the low melting ceramic frits for the most part used therefore. If there are used higher melting ceramic frits, the measuring wire easily takes up impurities and thereby its electrical properties are changed, whereby it is more difficult to keep the required narrow tolerance equilibrated values.

It was therefore the problem of the present invention to create a resistance element for a resistance thermometer which is usable at high temperatures, without taking up impurities through the fastening material.

This problem was solved according to the invention by using resistance elements which comprise a cylindrical carrier body, having a rectangular bore or hole therein in the direction of the longitudinal axis and of any crosssection a ceramic plate within said bore or hole and securely bound to at least one flat wall of said carrier body, a thin layer platinum resistor path with a temperature dependent electrical resistor path, firmly adhering to the surface of the ceramic plate opposite to that bound to said carrier body, electrical lead wires connected to said resistance path, the lead wires being secured to one or both ends of the carrier body by an electrically non-conducting sealing composition and said lead wires passing through said sealing composition to the outside.

The basis of the present invention is a ceramic plate preferably $Al_2O_3$, e.g. having the dimensions $2 \times 10 \times 0.6$ mm, which on one side is coated by known process with meander-shaped firmly adhering platinum paths as well as sealing surfaces. This ceramic chip provided with lead wires, is introduced into a small ceramic or metal tube with a suitable shaped, e.g. rectangular coaxial groove and firmly sintered, soldered or adhered on one side of this groove with the opposite side of the platinum layer resistor. The ends of the grooved tube are sealed with a ceramic composition. The advantages of this construction are as follows:

a. The platinum conductor pulley only comes in contact with the ceramic substrate, but not with any melting composition so that no impurities can falsify the measuring value.

b. The production of plate shaped layer resistors is possible very economically with the methods known from microelectronics.

c. Since the platinum resistor paths themselves do not contact the carrier body, the carrier body can also be made of metal.

Figure 1:
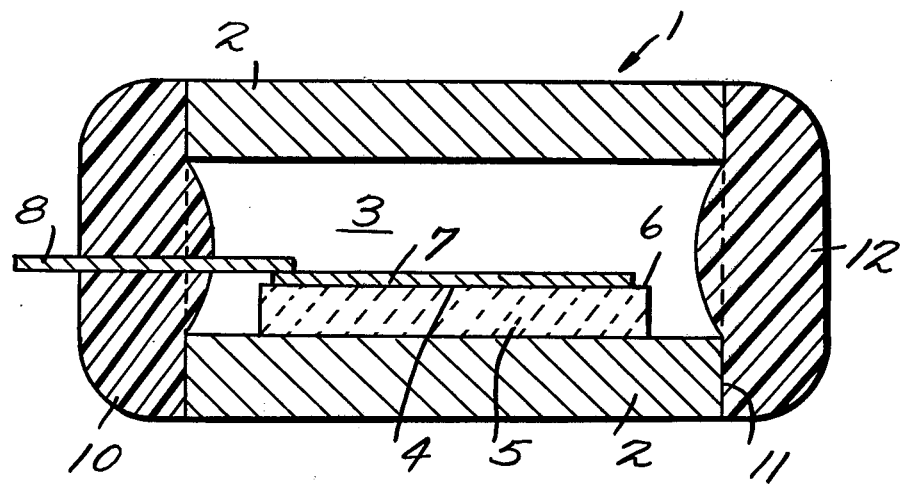
FIG. 1 is a longitudinal sectional view of one form of the invention.
Figure 2:
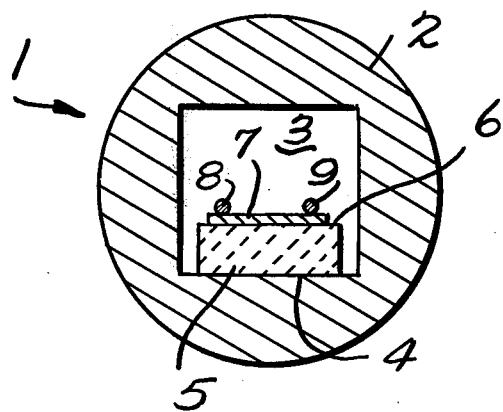
FIG. 2, is a cross-sectional view of the same form of the invention.

Referring more specifically to the drawings, the resistance element indicated generally at 1 consists of a cylindrically shaped carrier body 2 having a rectangular bore or hole 3 therein in the direction of the longitudinal axis. An aluminum oxide Plate 5 (i.e., a ceramic plate) is attached to a flat wall 4 of the carrier body 2. There is carried on the opposite side 6 of the ceramic plate a thin resistance layer 7. The connection to this resistance layer 7 is produced via lead wires 8 and 9, which are secured with a sealing composition 10 to the shaped body 2. The other end 11 of the shaped body 2 is likewise closed by a sealing composition 12 by which both sealing compositions do not come in contact with the resistance layer 7.

What is claimed is:

1. A resistance element comprising a cylindrical carrier body, a generally rectangular bore therein, a ceramic plate within said bore having one surface secured to a flat wall of said carrier body, a thin layer platinum resistor path with a temperature dependent electrical resistance firmly adhered to the opposite surface of said ceramic plate, electrical lead wires connected to said resistance path, an electrically non-conducting sealing composition securing said lead wires to at least one end of said carrier body, said lead wires extending through said sealing composition to outside said carrier body.

2. A resistance element according to claim 1 wherein said bore is in the direction of the longitudinal axis of said carrier body.

* * * * *